3,032,559
RESOLUTION OF TRIMELLITIC ANHYDRIDE AND BENZENE DICARBOXYLIC ACIDS
Arthur G. Hirsch, Dyer, and James O. Knobloch, Hobart, Ind., assignors to Standard Oil Company, Chicago, Ill., a corporation of Indiana
No Drawing. Filed Mar. 21, 1960, Ser. No. 16,191
4 Claims. (Cl. 260—346.3)

This invention relates to trimellitic anhydride and particularly to the obtaining of higher purity trimellitic anhydride from material contaminated with benzene dicarboxylic acid.

Trimellitic anhydride obtained by the oxidation of pseudocumene normally contains contaminating amounts of materials other than trimellitic anhydride. Even under carefully controlled conditions it has been found that benzene dicarboxylic acids such as phthalic acid are formed. Also, it is thought that substituted phthalic acids may be present due to incomplete oxidation. When a high purity trimellitic anhydride is desired, the presence of these contaminants which may exist up to about 5 weight percent requires removal. The presently known procedures for effecting such purification are costly and relatively ineffective.

It has been discovered that benzene dicarboxylic acid contaminants may be separated from trimellitic anhydride by dissolving the trimellitic anhydride away from the contaminants using a hereinafter defined liquid solvent. The contaminants are only slightly soluble in the liquid solvent and may be filtered or otherwise separated from the solution containing trimellitic anhydride. Trimellitic anhydride of improved purity is then recovered from the liquid solvent.

The solvent utilized in the method of the invention is either a normally liquid alkanone, dialkyl ether, or ester of an alkanol with an alkanoic acid. It is preferred that the solvent having a boiling point at atmospheric pressure such that it can be readily separated from the dissolved trimellitic anhydride by distillation.

The alkanones utilizable herein include not only saturated aliphatic ketones but also the cycloaliphatic ketones. Examples of suitable alkanones are: Acetone, methyl ethyl ketone, methyl isopropyl ketone, diethyl ketone, methyl-n-hexyl ketone, cyclopentanone, and cyclohexanone.

The dialkyl ethers utilizable include not only saturated aliphatic ethers but also saturated cycloaliphatic ethers. Illustrations of suitable ethers are: Diethyl ether, methyl n-propyl, methyl tert-butyl, ethyl n-butyl, n-propyl, tert-butyl, isoamyl, bis(2-ethylhexyl), and cyclopropyl methyl.

Illustrations of suitable esters of alkanols and alkanoic acids are: formates: isopropyl, n-octyl; acetates: ethyl, isobutyl, n-hexyl; propionates: isobutyl, n-hexyl; hexanoates: isopropyl, n-amyl, n-octyl; octanoates: methyl, n-hexyl; and methyl nononoate.

The method of the invention is preferably carried out utilizing anhydrous solvent and under anhydrous conditions. The trimellitic anhydride reacts with water to form trimellitic acid; this trimellitic acid is more soluble than the benzene dicarboxylic acid contaminants but is mainly wasted from the trimellitic anhydride product. The amount of water content of the solvent will therefore be function of the cost of preparing anhydrous solvent and the value of the benzene dicarboxylic acids and trimellitic acid separated from the impure trimellitic anhydride.

The method of the invention utilizes the minimum amount of liquid solvent needed to bring into solution essentially all of the trimellitic anhydride content of the charge. The amount of excess solvent should be limited to that which would keep the retention of contaminants to that tolerable for the particular end use of the purified trimellitic anhydride.

The purification is carried out at a temperature convenient for the particular solvent, keeping in mind that economic advantages may accrue with the increased solubility of the trimellitic anhydride with the solvent in the dissolving step of the method. In general, the contacting of solvent and trimellitic anhydride charge is carried out at a temperature from about 30° C. to about 125° C.

The lower temperatures are particularly suitable when the trimellitic anhydride will be recovered from the solution by distilling away the solvent. In the case of higher boiling point solvents, it is preferable to recover the trimellitic anhydride from the solution by crystallization procedure; the solution is formed at elevated temperature and then the solution is cooled to about ambient temperature to precipitate the trimellitic anhydride content.

*Example*

The method of the invention is illustrated by the purification of trimellitic anhydride prepared by the oxidation of pseudocumene. The trimellitic anhydride was distilled under vacuum to obtain a distillate of supposedly good purity trimellitic anhydride.

110 grams of distilled trimellitic anhydride were contacted with 220 grams of acetone at 30° C. Solution was readily accomplished; the resultant solution contained undissolved, finely divided particles. On filtering the particles amounted to 1.7 grams.

An acid number of 653 was obtained on the undissolved portion. On melting some of this solid on a Fisher-Johns melting point apparatus, slight bubbling was noted at 190° C., indicating the formation of phthalic anhydride from o-phthalic acid. The solid began to melt at 204–206° C. and was about ⅓ melted at 220° C. The melt was very hazy. The melt started to clear up as temperature was raised and was all melted at 310–320° C. This indicates the presence of mixed phthalic acids in the trimellitic anhydride.

Thus, having described the invention, what is claimed is:

1. A method of improving the purity of trimellitic anhydride contaminated with benzene dicarboxylic acid which method comprises contacting, at a temperature from about 30° C. to about 125° C., said impure anhydride with an amount of a liquid solvent sufficient to dissolve essentially all of the trimellitic anhydride content, separating solution containing trimellitic anhydride from solids comprising benzene dicarboxylic acid, and recovering from said solution trimellitic anhydride of purity higher than said impure anhydride, and wherein said solvent is a normally liquid member selected from the class consisting of alkanones, dialkyl ethers and esters of alkanols with alkanoic acids.

2. The method of claim 1 where said solvent is acetone.

3. The method of claim 1 where said solvent is ethyl acetate.

4. The method of claim 1 where said solvent has a boiling point permitting ready distillative separation from trimellitic anhydride.

References Cited in the file of this patent

Holmyard: Outlines of Org. Chem. (Third Edition, 1954), page 12.

Amoco Chemicals Corporation Development Dept., "Trimellitic Anhydride," September 2, 1958, page 3.